Jan. 1, 1946.  J. M. NEWMARK  2,392,057
SOCKET FOR PRESSURE GAUGES
Filed Oct. 19, 1943

INVENTOR.
JOSEPH M. NEWMARK.

BY
*A.C. Bierman*
ATTORNEY

Patented Jan. 1, 1946

2,392,057

UNITED STATES PATENT OFFICE 2,392,057

SOCKET FOR PRESSURE GAUGES

Joseph M. Newmark, New York, N. Y.

Application October 19, 1943, Serial No. 506,794

1 Claim. (Cl. 73—418)

The present invention is directed to pressure gauges, and more particularly, to a construction wherein the socket which normally constitutes an integral part of a pressure gauge and the mechanisms associated with said socket are formed as an integral unit.

A pressure gauge such as of the Bourdon tube type has been made by providing a socket which is a hollow member into which the Bourdon tube is fitted, and it also has means whereby pressure may be transmitted through a suitable type of pipe to the socket. In prior practice, it was customary to attach to the socket various elements which were necessary either for the mounting of mechanism or for the purpose of associating other elements therewith. Much of the structure was formed by bolting, riveting or otherwise attaching various parts to the socket. This was quite expensive, in that it required a considerable number of parts and it also necessitated a substantial amount of labor in order to assemble the unit. Close attention had to be paid to the exact alinement of the several elements so assembled, in order that when the other portions of the mechanisms were attached thereto, each of such attachments would fit into its proper place. This also necessitated additional labor and further increased the cost of production.

The present invention is intended and adapted to overcome the difficulties and disadvantages encountered in prior structures of this type and to provide a socket which is formed integrally with its associated elements and in which all of the parts are so interrelated that the assembly of the mechanism thereon is rendered a simple and rapid procedure.

It is also among the objects of the present invention to provide a structure which is highly effective, which can be produced in quantity at a low cost, and which is capable of assembly by the use of relatively unskilled labor.

It is a still further object of the present invention to provide a structure which contains a dial, said dial being so mounted on the socket and associated parts as to allow adjustment of the position thereof in a simple manner and at the same time allow the dial to be firmly clamped into its final position.

In practicing the present invention there is provided the central member or base of the socket which is hollow and which preferably is prismatic in form, having parallel front and rear faces. Extending from the lower end of the base is an inlet tube for pressure and on one side thereof and connecting therewith is an annular tube which is adapted to be expanded by the application of pressure.

The hollow base has integrally formed thereon an upwardly extending plate which is on the rear face thereof and which constitutes an extension of the plane of said face. At the upper end of said plate is a transverse post which extends forwardly in the direction of the plane of the front face of said base and the end of the post is in said plane. The socket is also provided with a pair of lateral extensions on the front face thereof and integrally formed therewith, said lateral extensions being in the plane of the front face. The extensions and post constitute a three-point support for a dial and three slots are formed in the dial through which set screws pass into said elements and clamp the dial in position.

There may also be provided a pair of lugs extending laterally from the rear face of the base and in the plane thereof. This furnishes means for attaching the assembled mechanism in a case or other support for the same. All of the several elements, including the base, the lateral extensions and lugs, the plate and the post, are formed integrally by any suitable means. Preferably, all of the parts are cast together so that the structure is unitary and strong and the cost thereof is extremely low.

In the accompanying drawing constituting a part hereof and in which like reference characters indicate like parts:

Figure 1:
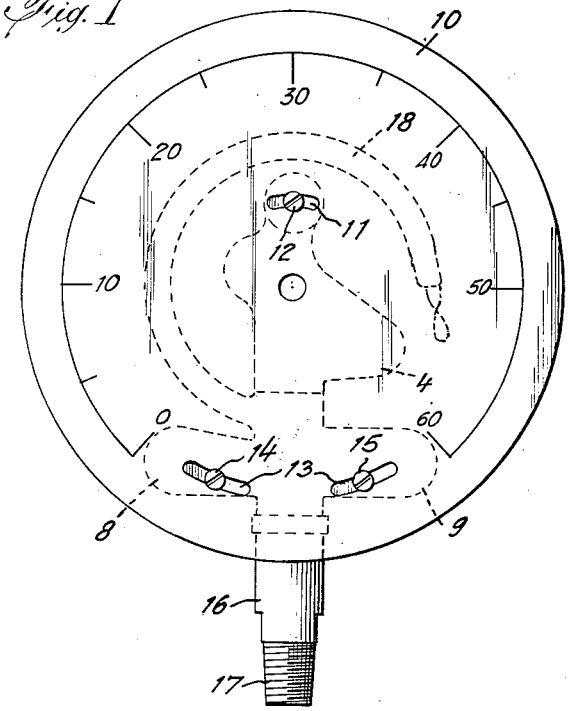
Fig. 1 is a front view of a socket made in accordance with the present invention having a dial placed thereon.
Figure 2:
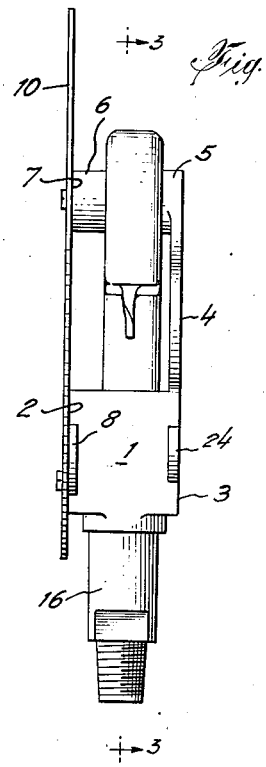
Fig. 2 is a side elevational view thereof.
Figure 3:
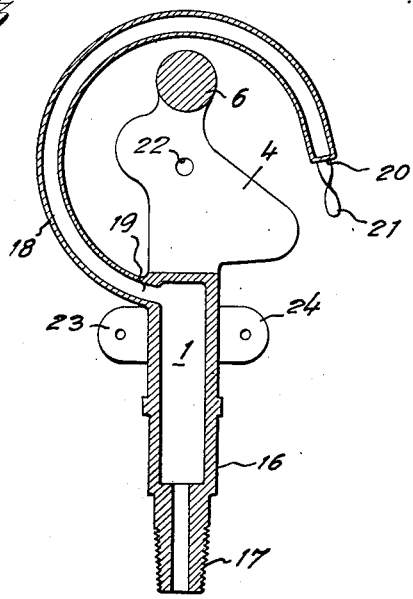
Fig. 3 is a vertical cross-sectional view taken along the line 3—3 of Fig. 2 and showing particularly the plate, post and lugs.

There is provided a hollow socket base 1 which, as shown, is approximately cubical in form. It has a front face 2 and a rear face 3 the planes of which are parallel. Extending upwardly from face 3 is a plate 4 of irregular outline, as shown particularly in Figures 1 and 3. The particular shape shown is not essential to the present invention but has been illustrated in this form as being adapted to hold a certain type of mechanism. At the upper end 5 of plate 4 is a post 6 which extends forwardly and transversely to the plate 4. The free end or face 1 thereof is in the same plane as face 2 of base 1.

Lateral extensions 8 and 9 formed integrally with base 1 extend on both sides of face 2 and in the same plane. A dial 10 is provided with a slot 11 through which passes a set screw 12 into a threaded opening in the end 7 of post 6. The dial is further provided with a pair of slots 13 at the lower portion thereof through which set screws 14 and 15 pass into threaded openings in extensions 8 and 9. By this construction one may assemble a dial by the use of screws 12, 14 and 15 without fully tightening said screws, then adjust the position of the dial until it is in exactly the right location and then complete the clamping of the screws to hold the dial in its final position firmly against accidental movement thereof.

Formed integrally with base 1 and extending downwardly is a pipe 16 having a threaded end 17 whereby the gauge may be attached to a suitable source of pressure to be measured. A Bourdon tube 18 is inserted at 19 into one side of base 1 by any suitable method, as by brazing. It is in arcuate form and extends around and over post 6 which has its free end 20 sealed. An extension 21 is provided at the sealed end and constitutes means for attachment to a link which in turn is part of the operating mechanism for the pointer which operates over the dial. The mechanism is not shown, but it normally is held through suitable openings such as 22, by screws, bolts or other means, to the plate 4. Lugs 23 and 24 extending laterally from the rear face 3 of base 1 have openings therein for the reception of screws or the like, whereby the assembled gauge mechanism may be held in a suitable casing.

Although the invention has been described by the use of a single and specific example or embodiment, the invention is not limited thereto as many changes may be made in the details of construction without departing from the spirit of the invention. For instance, the assembled unitary socket need not be made by a simple casting operation, but may be made by die casting as a single finished unit or by other suitable methods. The several faces need not be in the same plane in their entirety, but sufficiently so that the dial may be readily assembled on the front of the gauge and the rear face thereof is such as to fit snugly into the casing of the gauge. The hollow base need not be cubical in shape but may be of any other shape commensurate with the objects of the present invention. If desired, the tube 18 may be secured to the socket by the process of casting said socket.

These and other changes of similar character may be made in various other details of the construction within the spirit of the invention, and the scope thereof is to be broadly construed and not to be limited except by the character of the claim appended hereto.

What I claim is:

A socket for pressure gauges and the like comprising a hollow base having front and rear faces, an inlet pipe for fluid integrally formed therewith, an upwardly extending plate on said rear face of said base formed integrally therewith and in the plane of said face, a transverse post formed integrally with the end of said plate, the end face of said post being in the plane of said front face of said base, a pair of lateral extensions on said front face integral therewith, a Bourdon tube having one end fitted into a side face of said hollow base above said extensions, said tube being of arcuate form enclosing said post, the spread of said extensions being approximately equal to the diameter of the arc of said tube, there being a threaded opening on said post and on each of said extensions, a circular dial having an arcuate slot above the center of said dial and a pair of arcuate slots below said center, the lower slots being a greater distance from said center than the upper slot, screws passing through said slots and into said threaded openings to directly attach said dial to said front face and post, a pair of lugs extending laterally from said rear face in the plane thereof and formed integrally therewith whereby said socket may be secured to a mounting, said lugs being located within the area bounded by horizontal planes at top and bottom of said extensions.

JOSEPH M. NEWMARK.